United States Patent
Morin et al.

(10) Patent No.: US 6,794,033 B2
(45) Date of Patent: Sep. 21, 2004

(54) LOW-SHRINK POLYPROPYLENE TAPE FIBERS COMPRISING HIGH AMOUNTS OF NUCLEATING AGENTS

(75) Inventors: Brian G. Morin, Greer, SC (US); Martin E. Cowan, Moore, SC (US); Jack A. Smith, Zirconia, NC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/655,227

(22) Filed: Sep. 4, 2003

(65) Prior Publication Data

US 2004/0086713 A1 May 6, 2004

Related U.S. Application Data

(62) Division of application No. 10/286,622, filed on Nov. 2, 2002.

(51) Int. Cl.$^7$ .................................................. D01F 6/00
(52) U.S. Cl. ........................................ 428/394; 428/364
(58) Field of Search ................................ 428/394, 364, 428/372; 524/387, 285

(56) References Cited

U.S. PATENT DOCUMENTS

| | | | |
|---|---|---|---|
| 4,016,118 A | 4/1977 | Hamada et al. | 524/108 |
| 4,116,626 A | 9/1978 | Varner | 4/149 |
| 4,132,817 A | 1/1979 | Tillotson | 427/244 |

(List continued on next page.)

FOREIGN PATENT DOCUMENTS

| | | |
|---|---|---|
| EP | 94810025.1 | 4/1994 |
| EP | 0 806 237 | 5/1997 |

(List continued on next page.)

OTHER PUBLICATIONS

Patent abstracts of Japan; publication No. 11–061554; date of publication of application Mar. 5, 1999; Highly heat–resistant polypropylene fiber; English translation.

(List continued on next page.)

Primary Examiner—N. Edwards
(74) Attorney, Agent, or Firm—Terry T. Moyer; John E. Vick, Jr.

(57) ABSTRACT

Improvements in preventing heat- and moisture-shrink problems in specific polypropylene tape fibers are provided. Such tape fibers are basically manufactured through the initial production of polypropylene films or tubes which are then slit into very thin, though flat (and having very high cross sectional aspect ratios) tape fibers thereafter. These inventive tape fibers (and thus the initial films and/or tubes) require the presence of relatively high amounts of certain compounds that quickly and effectively provide rigidity to the target polypropylene tape fiber. Generally, these compounds include any structure that nucleates polymer crystals within the target polypropylene after exposure to sufficient heat to melt the initial pelletized polymer and allowing such an oriented polymer to cool. The compounds must nucleate polymer crystals at a higher temperature than the target polypropylene without the nucleating agent during cooling. In such a manner, the "rigidifying" nucleator compounds provide nucleation sites for polypropylene crystal growth. Subsequent to slitting the initial film and/or tube, the fiber is then exposed to sufficient heat to grow the crystalline network, thus holding the fiber in a desired position. The preferred "rigidifying" compounds include dibenzylidene sorbitol based compounds, as well as less preferred compounds, such as [2.2.1]heptane-bicyclodicarboxylic acid, otherwise known as HPN-68, sodium benzoate, certain sodium and lithium phosphate salts [such as sodium 2,2'-methylene-bis-(4,6-di-tert-butylphenyl)phosphate, otherwise known as NA-11]. Specific methods of manufacture of such inventive tape fibers, as well as fabric articles made therefrom, are also encompassed within this invention.

23 Claims, 2 Drawing Sheets

U.S. PATENT DOCUMENTS

| | | | |
|---|---|---|---|
| 4,171,395 A | 10/1979 | Tollotson | 428/95 |
| 4,463,113 A | 7/1984 | Nakahara et al. | 524/117 |
| 4,512,831 A | 4/1985 | Tillotson | 156/78 |
| 4,522,857 A | 6/1985 | Higgins | 428/95 |
| 4,560,734 A | 12/1985 | Fujishita et al. | 526/142 |
| 5,049,605 A | 9/1991 | Rekers | 524/108 |
| 5,136,520 A | 8/1992 | Cox | 364/470 |
| 5,208,592 A | 5/1993 | Johnson, Jr. | 341/63 |
| 5,231,126 A | 7/1993 | Shi et al. | 524/296 |
| 5,342,868 A | 8/1994 | Kimura et al. | 524/108 |
| 5,512,357 A | 4/1996 | Shimura et al. | 428/283 |
| 5,540,968 A | 7/1996 | Higgins | 428/95 |
| 5,545,276 A | 8/1996 | Higgins | 156/79 |
| 5,753,736 A | 5/1998 | Bhat | 524/287 |
| 5,798,167 A | 8/1998 | Connor et al. | 428/171 |
| 5,811,045 A | 9/1998 | Pike | 264/168 |
| 5,912,292 A | 6/1999 | Sun | 524/301 |
| 5,945,215 A | 8/1999 | Bersted et al. | 428/364 |
| 5,948,500 A | 9/1999 | Higgins | 428/95 |
| 6,102,999 A | 8/2000 | Cobb, III et al. | 106/243 |
| 6,110,588 A | 8/2000 | Perez et al. | 428/359 |
| 6,127,440 A | 10/2000 | Sanyasi | 521/74 |
| 6,127,470 A | 10/2000 | Cobb, III et al. | 524/367 |
| 6,135,987 A | 10/2000 | Tsai et al. | 604/365 |
| 6,162,887 A | 12/2000 | Yamada et al. | 526/351 |
| 6,203,881 B1 | 3/2001 | Higgins | 428/95 |
| 6,207,600 B1 | 3/2001 | Nakajima et al. | 442/311 |
| 6,210,802 B1 | 4/2001 | Risch et al. | 428/398 |
| 6,218,011 B1 | 4/2001 | Raetzsch et al. | 428/394 |
| 6,231,976 B1 | 5/2001 | Dean et al. | 428/373 |
| 6,238,615 B1 | 5/2001 | Kobayashi et al. | 264/537 |
| 6,261,677 B1 | 7/2001 | Tsai et al. | 428/221 |
| 6,270,608 B1 | 8/2001 | Vair, Jr. et al. | 156/176 |
| 6,284,370 B1 | 9/2001 | Fujimoto et al. | 428/221 |
| 6,300,415 B1 | 10/2001 | Okayama et al. | 525/191 |
| 6,358,450 B1 | 3/2002 | Sun | 264/178 |
| 6,420,024 B1 | 7/2002 | Perez et al. | 428/359 |
| 6,468,623 B1 | 10/2002 | Higgins | 428/95 |
| 6,534,574 B1 * | 3/2003 | Zhao et al. | 524/284 |
| 6,541,554 B2 * | 4/2003 | Morin et al. | 524/387 |
| 6,559,211 B2 * | 5/2003 | Zhao et al. | 524/285 |
| 6,559,216 B1 | 5/2003 | Zhao et al. | 524/336 |
| 6,656,404 B2 | 12/2003 | Morin et al. | 264/210.5 |
| 2001/0040320 A1 | 11/2001 | Kobayashi et al. | 264/537 |
| 2001/0048179 A1 | 12/2001 | Stewart et al. | 264/211 |
| 2002/0002241 A1 | 1/2002 | Raetzsch et al. | 123/556 |

FOREIGN PATENT DOCUMENTS

| | | |
|---|---|---|
| JP | 11061554 A | 3/1999 |
| JP | 11140719 | 5/1999 |
| JP | P2002-302825 | 4/2001 |
| WO | WO 02/46502 | 6/2002 |

OTHER PUBLICATIONS

Patent abstracts of Japan; publication No. 11–181619; date of publication of application Jul. 6, 1999; Highly heat–resistant polypropylene fiber and fiber–reinforced cement molded product using the same; English translation.

Patent abstracts of Japan; publication No. 2001–081628; date of publication Mar. 27, 2001; Flat yarn for base cloth of needle–punched carpet: English translation.

Patent abstracts of Japan; publication No. 2002–302825; date of publication Oct. 18, 2002; Highly–resistant polypropylene fibers; English translation.

Article; Journal of applied polymer science, vol. 62, 1965–1975 (1996) John Wiley & Sons, Inc.; Spruiell et al.

Article; The effects of pigments on the development of structure and properties of polypropylene filaments; Antec '91; Lin et al.

Article; The role of crystallization kinetics in the development of the structure and properties of polypropylene filaments; © 1993 John Wiley & Sons, Inc.; CCC 0021–8995/93/040623–9.

Article; Study on the formation of b–crystalline from isotactic polypropylene fiber; fiber and films; Intern. Polymer Processing VI, 1991; Chen et al.

Article; Heterogeneous Nucleation of Polypropylene and Polypropylene Fibers; Marcincin et al.; 1994.

\* cited by examiner

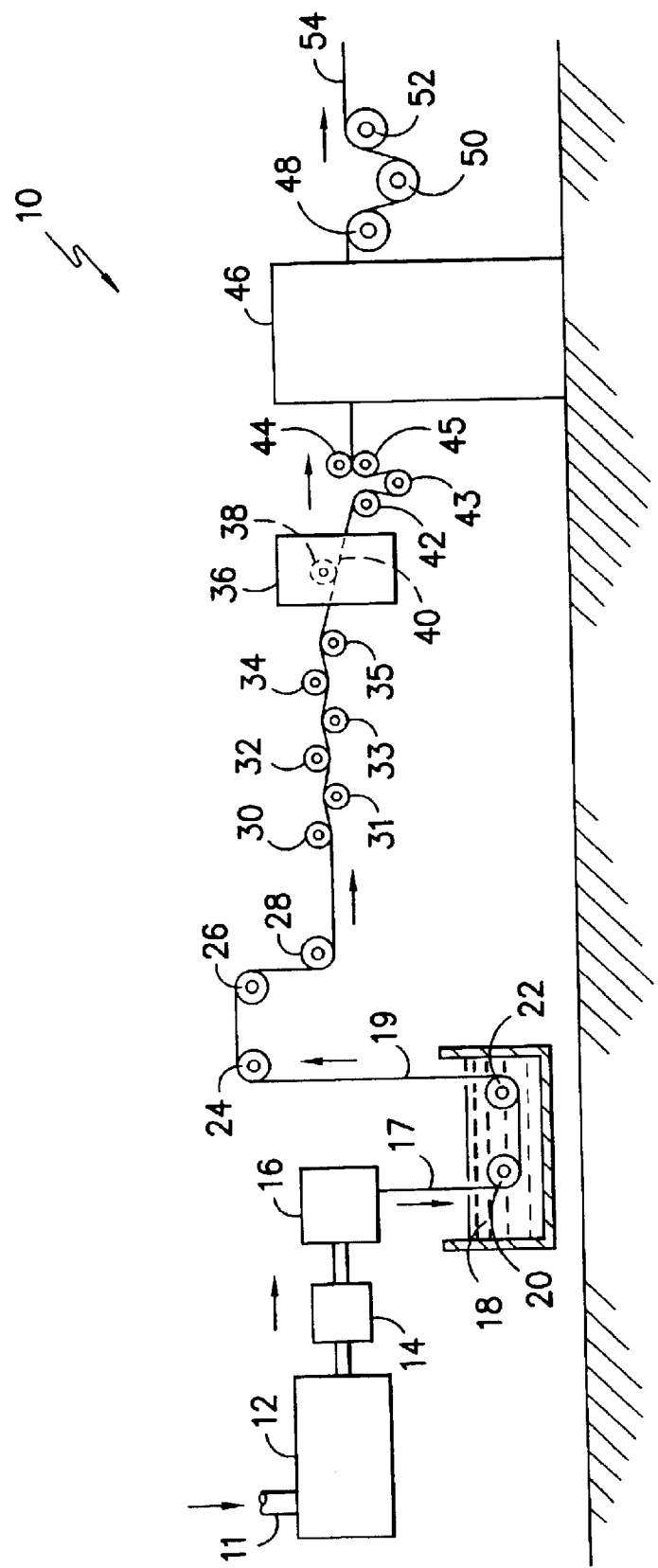
FIG. -1-

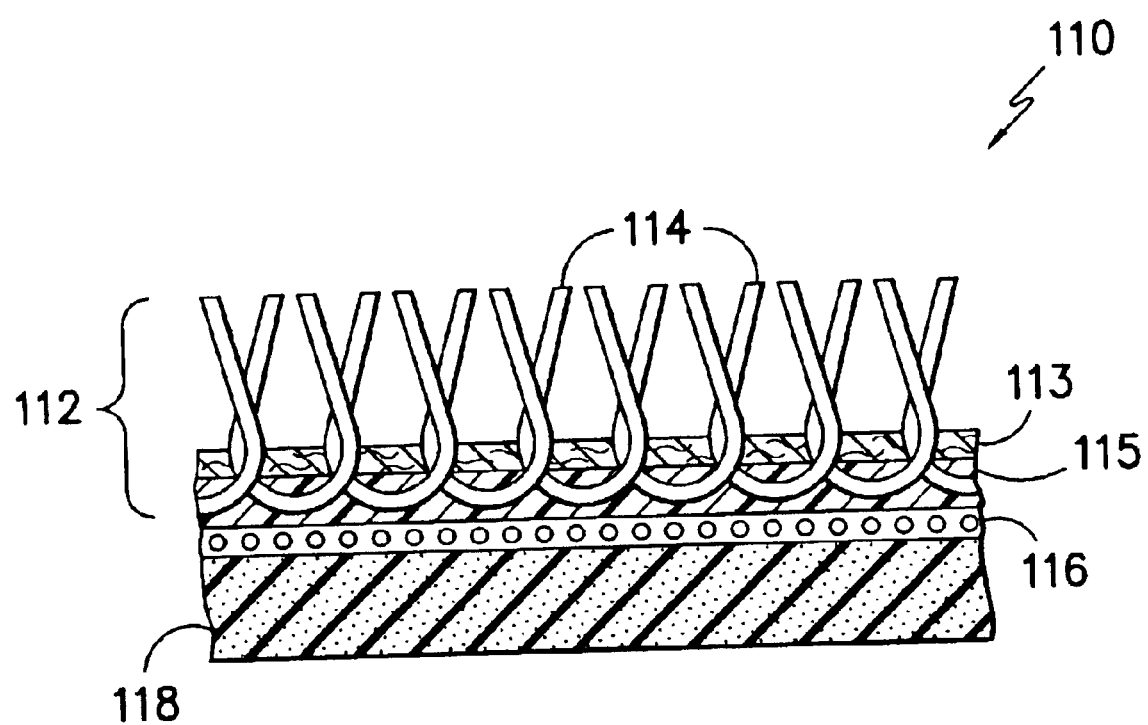
FIG. -2-

LOW-SHRINK POLYPROPYLENE TAPE FIBERS COMPRISING HIGH AMOUNTS OF NUCLEATING AGENTS

CROSS REFERENCE TO RELATED APPLICATIONS

This application is a divisional of co-pending application Ser. No. 10/286,622, filed on Nov. 2, 2002.

FIELD OF THE INVENTION

This invention relates to improvements in preventing heat- and moisture-shrink problems in specific polypropylene tape fibers. Such tape fibers are basically manufactured through the initial production of polypropylene films or tubes which are then slit into very thin, though flat (and having very high cross sectional aspect ratios) tape fibers thereafter. These inventive tape fibers (and thus the initial films and/or tubes) require the presence of relatively high amounts of certain compounds that quickly and effectively provide rigidity to the target polypropylene tape fiber. Generally, these compounds include any structure that nucleates polymer crystals within the target polypropylene after exposure to sufficient heat to melt the initial pelletized polymer and allowing such an oriented polymer to cool. The compounds must nucleate polymer crystals at a higher temperature than the target polypropylene without the nucleating agent during cooling. In such a manner, the "rigidifying" nucleator compounds provide nucleation sites for polypropylene crystal growth. Subsequent to slitting the initial film and/or tube, the fiber is then exposed to sufficient heat to grow the crystalline network, thus holding the fiber in a desired position. The preferred "rigidifying" compounds include dibenzylidene sorbitol based compounds, as well as less preferred compounds, such as [2.2.1]heptane-bicyclodicarboxylic acid, otherwise known as HPN-68, sodium benzoate, certain sodium and lithium phosphate salts [such as sodium 2,2'-methylene-bis-(4,6-di-tert-butylphenyl)phosphate, otherwise known as NA-11]. Specific methods of manufacture of such inventive tape fibers, as well as fabric articles made therefrom, are also encompassed within this invention.

BACKGROUND OF THE PRIOR ART

Polypropylene tape fibers are utilized in various end-uses, including carpet backings, scrim fabrics, supersacks, and other fabrics for article reinforcement or dimensional stability purposes. Unfortunately, prior applications utilizing standard polypropylene tape fibers have suffered from relatively high shrinkage rates, due primarily to the fiber constituents. Heat, moisture, and other environmental factors all contribute to shrinkage possibilities of the polypropylene tape fibers (and yarns made therefrom), thereby causing a residual effect of shrinkage within the article itself. Thus, although such polypropylene tape fibers are highly desired in such end-uses as carpet backings, unfortunately, shrinkage causes highly undesirable warping or rippling of the final carpet product. Or, alternatively, the production methods of forming carpets (such as, for example, carpet tiles) compensate for expected high shrinkage, thereby resulting in generation of waste materials, or, at least, the loss of relatively expensive amounts of finished carpet material due to expected shrinkage of the carpet itself, all the result of the shrinkage rates exhibited by the carpet backing fibers themselves. Furthermore, such previously manufactured and practiced tape fibers suffer from relatively low tensile strengths. For scrim fabrics (such as in roofing articles, asphalt reinforcements, and the like), such shrinkage rate problems are of great importance as well to impart the best overall reinforcement capabilities to the target article and permitting the reinforced article to remain flat. Utilization of much more expensive polyesters and polyamides as constituent fibers has constituted the only alternative methods to such problematic high shrinkage, low tensile strength tape fibers in the past (for both carpet backings and scrim applications).

There has been a continued desire to utilize such polypropylene tape (high aspect ratio) fibers in various different products (as alluded to above), ranging from apparel to carpet backings (as well as carpet pile fabrics) to reinforcement fabrics, and so on. Such polypropylene tape fibers exhibit excellent strength characteristics and do not easily degrade or erode when exposed to certain "destructive" chemicals. However, even with such impressive and beneficial properties and an abundance of polypropylene, which is relatively inexpensive to manufacture and readily available as a petroleum refinery byproduct, such fibers are not widely utilized in products that are exposed to relatively high temperatures during use, cleaning, and the like. This is due primarily to the aforementioned high and generally non-uniform heat- and moisture-shrink characteristics exhibited by typical polypropylene tape fibers. Such fibers are not heat stable and when exposed to standard temperatures (such as 150° C. and 130° C. temperatures), the shrinkage range from about 2% (in boiling water) to about 3–4% (for hot air exposure) to 5–6% (for higher temperature hot air). These extremely high and varied shrink rates thus render the utilization and processability of highly desirable polypropylene fibers very low, particularly for end-uses that require heat stability (such as carpet pile, carpet backings, molded pieces, and the like).

Past uses of polypropylene tape fibers within carpet backings have resulted in the necessity of estimating non-uniform shrinkage rates for final products and thus to basically expect the loss of a certain amount of product during such manufacturing and/or further treatment. For example, after a tufted fiber component is first attached to its primary carpet backing component for dimensional stability during printing, if such a step is desired to impart patterns of color or overall uniform colors to the target tufted substrate. After printing, a drying step is required to set the colors in place and reduce potential bleeding therefrom. The temperatures required for such a printing step (e.g., 130° C. and above) are generated within a heated area, generally, attached to the printing assembly. At such high temperatures, typical polypropylene tape fiber-containing backings exhibit the aforementioned high shrink rates (e.g., between 2–4% on average). Such shrinkage unfortunately dominates the dimensional configuration of the printed tufted substrate as well and thus dictates the ultimate dimensions of the overall product prior to attachment of a secondary backing. Such a secondary backing is thus typically cut to a size in relation to the expected size of the tufted component/primary backing article. Nonuniformity in shrinkage, as well as the need to provide differently sized secondary backings to the primary and tufted components thus evince the need for low-shrink polypropylene tape fiber primary carpet backings. With essentially zero shrinkage capability, the reliable selection of a uniform, proper size for the secondary backing would be a clear aid in reducing waste and cost in the manufacture of such carpets. The same general problems are associated with monofilament propylene fibers as well.

If printing is not desired, there still exist potential problems in relation to high-shrink tape fiber primary backing fabrics, namely the instance whereupon a latex adhesive is required to attach the remaining secondary backing components (as well as other components) to the tufted substrate/primary backing article. Drying is still a requirement to effectuate quick setting of such an adhesive. Upon exposure to sufficiently high temperatures, the sandwiched polypropylene tape fiber-containing primary backing will undergo a certain level of shrinkage, thereby potentially causing buckling of the ultimate product (or other problems associated with differing sizes of component parts within such a carpet article).

To date, there has been no simple solution to such problems, at least that provides substantially the same tensile strength exhibited by such higher-shrink tape fibers. Some ideas for improving upon the shrink rate characteristics of non-tape polypropylene fibers have included narrowing and controlling the molecular weight distribution of the polypropylene components themselves in each fiber or mechanically working the target fibers prior to and during heat-setting. Unfortunately, molecular weight control is extremely difficult to accomplish initially, and has only provided the above-listed shrink rates (which are still too high for widespread utilization within the fabric industry). Furthermore, the utilization of very high heat-setting temperatures during mechanical treatment has, in most instances, resulted in the loss of good hand and feel to the subject fibers. Another solution to this problem is preshrinking the fibers, which involves winding the fiber on a crushable paper package, allowing the fiber to sit in the oven and shrink for long times, (crushing the paper package), and then rewinding on a package acceptable for further processing. This process, while yielding an acceptable yarn, is expensive, making the resulting fiber uncompetitive as compared to polyester and nylon fibers. As a result, there has not been any teaching or disclosure within the pertinent prior art providing any heat- and/or moisture-shrink improvements in polypropylene fiber technology. Additionally, it has been found that these limited shrink-rate improvement procedures for non-tape fibers do not transfer to tape fibers to provide any substantial low-shrink benefits.

As noted above, the main concern with this invention is the production of low-shrink single filament high-denier polypropylene fibers (e.g., tape or monofilament types). For the purpose of this invention, the term "tape fiber" or fibers is intended to encompass a monofilament fiber exhibiting a cross sectional aspect ratio of at least 2:1, and therefore is a relatively wide and flat fiber. As noted above, such a tape fiber is generally produced through the initial creation of a film and/or tube of polypropylene from which the desired fibers are then slit (thereby according the desired flat configuration through such a slitting procedure with the slitting means, such as blades, situated at substantially uniform distances from each other during the actual slitting process to provide substantially uniform aspect ratios for the target fibers themselves). The denier of the inventive fiber should be at least 50, and preferably higher, for example, up to about 1,000 and higher, such as within the range of 5,000 to 10,000.

DESCRIPTION OF THE INVENTION

It is thus an object of the invention to provide improved shrink rates without appreciably reducing tensile strengths for polypropylene tape fibers. A further object of the invention is to provide a class of additives that, in a range of concentrations, will provide low shrinkage and/or higher tensile strength levels for such inventive tape fibers (and yarns made therefrom). A further object of the invention is to provide a carpet made with a polypropylene backing exhibiting very low heat shrinkage rates. Another object of the invention is to provide a specific method for the production of nucleator-containing polypropylene tape fibers permitting the ultimate production of such low-shrink, high tensile strength, fabrics therewith. Yet another object of the invention is to provide a carpet article having a backing comprising a majority of relatively inexpensive polypropylene tape fibers that exhibits very low shrinkage.

Accordingly, this invention encompasses a polypropylene tape fiber, wherein said fiber comprises in excess of 2000 ppm and up to about 5000 ppm of a nucleator compound, and wherein said fiber exhibits a tensile strength of at least 3 grams/denier. Also encompassed within this invention is a polypropylene tape fiber, wherein said fiber comprises in excess of 2000 ppm, up to about 5000 ppm, of a nucleator compound, wherein said fiber exhibits a shrinkage rate after exposure to 150° C. hot air of at most 4%, and wherein said fiber further exhibits a tensile strength of at least 2.5 grams/denier. Also, this invention encompasses a polypropylene tape fiber, wherein said fiber exhibits an x-ray scattering long period of at least 20. Certain yarns and fabric articles comprising such inventive fibers are also encompassed within this invention. Of particular concern is a carpet article having a top side and a bottom side, wherein a fiber substrate of either tufted fiber, berber fiber, or like type is attached to said top side and a backing comprising a majority of single filament polypropylene fibers having a denier of at least 50, wherein said fibers comprise in excess of 2000 ppm, up to about 5000 ppm, of a nucleator compound, is attached to said bottom side. Preferably, such a carpet article exhibits very low shrinkage rates on par with those noted above.

Furthermore, this invention also concerns a method of producing such fibers comprising the sequential steps of a) extruding a heated formulation of polypropylene comprising at least an excess of 2000 ppm up to about 5000 ppm, preferably between at least about 2100 ppm and 4000 ppm, more preferably between about 2250 ppm and 3500 ppm, and most preferably between about 2250 and 3000 ppm, of a nucleator compound into a film or tube; b) immediately quenching the film or tube of step "a" to a temperature which prevents orientation of polypropylene crystals therein; c) slitting said film or tube with cutting means oriented longitudinally to said film or tube thereby to produce individual tape fibers therefrom; d) mechanically drawing said individual tape fibers at a draw ratio of at least 5:1 while exposing said fibers to a temperature of at between 200 and 400° F., preferably between 260 and 330° F., and most preferably between 270 and 300° F., thereby permitting crystal orientation of the polypropylene therein; e) exposing said fibers to a temperature of between 300° F. and 450° F. to set the fibers. Preferably, step "b" will be performed at a temperature of at most 95° C. and at least about 5° C., preferably between 5 and 60° C., and most preferably between 10 and 40° C. (or as close to room temperature as possible for a liquid through simply allowing the bath to acclimate itself to an environment at a temperature of about 25–30° C.). Again, such a temperature is needed to ensure that the component polymer (being polypropylene, and possibly other polymeric components, such as polyethylene, and the like, as structural enhancement additives therein that do not appreciably affect the shrinkage characteristics thereof) does not exhibit orientation of crystals. Alternately, step "c" can be eliminated by extruding multiple tape of the desired width without the slitting requirement "c". Upon the heated draw step, such orientation is effectuated which has now been determined to provide the necessary rigidification of the target tape fibers and thus to increase the strength and modulus of such fibers. The drawing speed to line speed ratio should exceed at least five times that of the rate of movement of the film to the cutting means. Preferably, such a drawing speed is at from 400–1500 feet/minute, while the prior speed of the film to the cutting means from about 50–400 feet/minute, with the drawing speed ratio between the two areas being from about 3:1 to about 15:1, and is discussed in greater detail below, as is the preferred method itself. The final heat-setting temperature is necessary to "lock" the polypropylene crystalline structure in place after extruding and drawing. Such a heat-setting step generally lasts for a portion of a second, up to potentially a couple of minutes (i.e., from about $\frac{1}{10}^{th}$ of a second, preferably about ½ of a second, up to about 3 minutes, preferably greater than ½ of a second). The heat-setting temperature must be well in excess of the drawing temperature and must be at least 265° F., more preferably at least about 290° F., and most preferably at least about 300° F. (and as high as 450° F.). The term "mechanically drawing" is intended to encompass any number of procedures which basically involve placing an extensional force on fibers in order to elongate the polymer therein. Such a procedure may be accomplished with any number of apparatus, including, without limitation, godet rolls, nip rolls, steam cans, hot or cold gaseous jets (air or steam), and other like mechanical means.

Such tape yarns may also be produced through extruding individual fibers of high aspect ratio and of a sufficient size, thereby followed by drawing and heatsetting steps in order to attain such low shrinkage rate properties. All shrinkage values discussed as they pertain to the inventive fibers and methods of making thereof correspond to exposure times for each test (hot air and boiling water) of about 5 minutes. The heat-shrinkage at about 150° C. in hot air is, as noted above, at most 4.0% for the inventive fiber; preferably, this heat-shrinkage is at most 3%; more preferably at most 2%; and most preferably at most 1%. Also, the amount of nucleating agent present within the inventive fiber is in excess of 2000 ppm; preferably this amount is at least 2100 ppm; and most preferably is at least 2250 ppm, up to a preferred maximum (for tensile strength retention) of about 5000 ppm, more preferably up to 4000 ppm, and most preferably as high as 3000 ppm. Any amount within this range should suffice to provide the desired shrinkage rates after heat-setting of the fiber itself.

Furthermore, it has now been determined that the presence of an excess of 2000 ppm and 5000 ppm of a nucleator compound within polypropylene fibers for incorporation within primary (or secondary) carpet backing provides the highly desirable result of little appreciable shrinkage of the backing, as well as of a tufted substrate/backing composite, or even of an entire carpet article. Thus, any low-shrink carpet backing component comprising a majority of polypropylene fibers including such nucleator compound (in the requisite amounts, preferably between 2100 and 4000 ppm, and most preferably between about 2250 and 3000 ppm), provides the necessary low shrinkage properties. Fibers and/or yarns of the inventive tape type, as well as polypropylene staple, multifilament, and monofilament, types, are available in such capacity for such improved, low-shrink carpet articles.

The term "polypropylene" is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as syndiotactic, isotactic, and the like). Thus, the term as applied to fibers is intended to encompass actual long strands, tapes, threads, and the like, of drawn polymer. The polypropylene may be of any standard melt flow (by testing); however, standard fiber grade polypropylene resins possess ranges of Melt Flow Indices between about 1 and 50. Contrary to standard plaques, containers, sheets, and the like (such as taught within U.S. Pat. No. 4,016,118 to Hamada et al., for example), fibers clearly differ in structure since they must exhibit a length that far exceeds its cross-sectional area (such, for example, its diameter for round fibers). Fibers are extruded and drawn; articles are blow-molded or injection molded, to name two alternative production methods. Also, the crystalline morphology of polypropylene within fibers is different than that of standard articles, plaques, sheets, and the like. For instance, the dpf of such polypropylene fibers is at most about 5000; whereas the dpf of these other articles is much greater. Polypropylene articles generally exhibit spherulitic crystals while fibers exhibit elongated, extended crystal structures. Thus, there is a great difference in structure between fibers and polypropylene articles such that any predictions made for spherulitic particles (crystals) of nucleated polypropylene do not provide any basis for determining the effectiveness of such nucleators as additives within polypropylene fibers.

The terms "nucleators", "nucleator compound(s)", "nucleating agent", and "nucleating agents" are intended to generally encompass, singularly or in combination, any additive to polypropylene that produces nucleation sites for polypropylene crystals from transition from its molten state to a solid, cooled structure. Hence, since the polypropylene composition (including nucleator compounds) must be molten to eventually extrude the fiber itself, the nucleator compound will provide such nucleation sites upon cooling of the polypropylene from its molten state. The only way in which such compounds provide the necessary nucleation sites is if such sites form prior to polypropylene recrystallization itself. Thus, any compound that exhibits such a beneficial effect and property is included within this definition. Such nucleator compounds more specifically include dibenzylidene sorbitol types, including, without limitation, dibenzylidene sorbitol (DBS), monomethyldibenzylidene sorbitol, such as 1,3:2,4-bis(p-methylbenzylidene) sorbitol (p-MDBS), dimethyl dibenzylidene sorbitol, such as 1,3:2, 4-bis(3,4-dimethylbenzylidene) sorbitol (3,4-DMDBS); other compounds of this type include, again, without limitation, sodium benzoate, NA-11, HPN-68, and the like (basically a nucleator that is not also a colorant, thereby capable of producing a nucleated uncolored fiber). The concentration of such nucleating agents (in total) within the target polypropylene fiber is at least in excess of 2000 ppm up to 5000 ppm, preferably at least 2100 ppm to 4000 ppm, and most preferably from 2250 to 3000 ppm. Furthermore, such inventive tape fibers must be produced by basically the slitting of extruded films or tubes as outlined above.

Also, without being limited by any specific scientific theory, it appears that the shrink-reducing nucleators which perform the best are those which exhibit relatively high solubility within the propylene itself. Thus, compounds which are readily soluble, such as 1,3:2,4-bis(p-methylbenzylidene) sorbitol provides the lowest shrinkage rate for the desired polypropylene fibers. The DBS derivative compounds are considered the best shrink-reducing nucleators within this invention due to the low crystalline sizes produced by such compounds. Other nucleators, such as NA-11 and HPN-68 (disodium [2.2.1]heptane bicyclodicarboxylate), also provide acceptable low-shrink characteristics to the target polypropylene fiber and thus are considered as potential nucleator compound additives within this invention. Basically, the selection criteria required of such nucleator compounds are particle sizes (the lower the better for ease in handling, mixing, and incorporation with the target resin), particle dispersability within the target resin (to provide the most effective nucleation properties), and nucleating temperature (e.g., crystallization temperature, determined for resin samples through differential scanning calorimetry analysis of molten nucleated resins), the higher such a temperature, the better.

It has been determined that the nucleator compounds that exhibit good solubility in the target molten polypropylene resins (and thus are liquid in nature during that stage in the fiber-production process) provide effective low-shrink characteristics. Thus, low substituted DBS compounds (including DMDBS and p-MDBS) appear to provide fewer manufacturing issues as well as lower shrink properties within the finished polypropylene fibers themselves. Thus, 3,4-DMDBS and p-MDBS are preferred, although, any of the above-mentioned nucleators may be utilized within this invention as long as the x-ray scattering measurements are met or the low shrink requirements are achieved through utilization of such compounds. Mixtures of such nucleators may also be used during processing in order to provide such low-shrink properties as well as possible organoleptic improvements, facilitation of processing, or cost.

In addition to those compounds noted above, sodium benzoate and NA-11 are well known as nucleating agents for standard polypropylene compositions (such as the aforementioned plaques, containers, films, sheets, and the like) and exhibit excellent recrystallization temperatures and very quick injection molding cycle times for those purposes. The dibenzylidene sorbitol types exhibit the same types of properties as well as excellent clarity within such standard polypropylene forms (plaques, sheets, etc.). For the purposes of this invention, it has been found that the dibenzylidene sorbitol types are preferred as nucleator compounds within the target polypropylene fibers.

The closest prior art references teach the addition of nucleator compounds to general polypropylene compositions (such as in U.S. Pat. No. 4,016,118, referenced above). However, some teachings include the utilization of certain DBS compounds within limited portions of fibers in a multicomponent polypropylene textile structure. For example, U.S. Pat. Nos. 5,798,167 to Connor et al. and 5,811,045 to Pike, both teach the addition of DBS compounds to polypropylene in fiber form; however, there are vital differences between those disclosures and the present invention. For example, both patents require the aforementioned multicomponent structures of fibers. Thus, even with DBS compounds in some polypropylene fiber components within each fiber type, the shrink rate for each is dominated by the other polypropylene fiber components which do not have the benefit of the nucleating agent. Also, there are no lamellae that give a long period (as measured by small-angle X-ray scattering) thicker than 20 nm formed within the polypropylene fibers due to the lack of a post-heatsetting step being performed. Again, these thick lamellae provide the desired inventive higher heat-shrink fiber. Also of importance is the fact that, for instance, Connor et al. require a nonwoven polypropylene fabric laminate containing a DBS additive situated around a polypropylene internal fabric layer which contained no nucleating agent additive. The internal layer, being polypropylene without the aid of a nucleating agent additive, dictates the shrink rate for this structure. Furthermore, the patentees do not expose their yarns and fibers to heat-setting procedures in order to permanently configure the crystalline fiber structures of the yarns themselves as low-shrink is not their objective.

In addition, Spruiell, et al, *Journal of Applied Polymer Science*, Vol. 62, pp. 1965–75 (1996), reveal using a nucleating agent, MDBS, at 0.1%, to increase the nucleation rate during spinning, but not for tape fibers. However, after crystallizing and drawing the fiber, Spruiell et al. do not expose the nucleated fiber to any heat, which is necessary to impart the very best shrinkage properties, therefore the shrinkage of their fibers was similar to conventional polypropylene fibers without a nucleating agent additive.

Of particular interest and which has been determined to be of primary importance in the production of such inventive low-shrink polypropylene fibers, is the discovery that, at the very least, the presence of nucleating agent within heat-set polypropylene fibers (as discussed herein), provides high long period measurements for the crystalline lamellae of the polypropylene itself. This discovery is best explained by the following:

Polymers, when crystallized from a melt under dynamic temperature and stress conditions, first supercool and then crystallize with the crystallization rate dependent on the number of nucleation sites, and the growth rate of the polymer, which are both in turn related to the thermal and mechanical working that the polymer is subjected to as it cools. These processes are particularly complex in a normal fiber drawing line. The results of this complex crystallization, however, can be measured using small angle x-ray scattering (SAXS), with the measured SAXS long period representative of an average crystallization temperature. A higher SAXS long period corresponds to thicker lamellae (which are the plate-like polymer crystals characteristic of semi-crystalline polymers like PP), and which is evidenced by a SAXS peak centered at a lower scattering angle than for comparative unnucleated polypropylene tape fibers. The higher the crystallization temperature of the average crystal, the thicker the measured SAXS long period will be. Further, higher SAXS long periods are characteristic of more thermally stable polymeric crystals. Crystals with shorter SAXS long periods will "melt", or relax and recrystallize into new, thicker crystals, at a lower temperature than those with higher SAXS long periods. Crystals with higher SAXS long periods remain stable to higher temperatures, requiring more heat to destabilize the crystalline structure.

In highly oriented polymeric samples such as fibers, those with higher SAXS long periods will remain stable to higher temperatures. Thus the shrinkage, which is a normal effect of the relaxation of the highly oriented polymeric samples, remains low to higher temperatures than in those highly oriented polymeric samples with lower SAXS long periods. In this invention, as is evident from these measurements, the nucleating additive is used in conjunction with a thermal treatment to create fibers exhibiting a center of the SAXS scattering peak of at most 0.4 degrees, which corresponds to thicker lamellae that in turn are very stable and exhibit low shrinkage up to very high temperatures.

Furthermore, such fibers may also be colored to provide other aesthetic features for the end user. Thus, the fibers may also comprise coloring agents, such as, for example, pigments, with fixing agents for lightfastness purposes. For this reason, it is desirable to utilize nucleating agents that do not impart visible color or colors to the target fibers. Other additives may also be present, including antistatic agents, brightening compounds, clarifying agents, antioxidants, antimicrobials (preferably silver-based ion-exchange compounds, such as ALPHASAN® antimicrobials available from Milliken & Company), UV stabilizers, fillers, and the like. Furthermore, any fabrics made from such inventive fibers may be, without limitation, woven, knit, non-woven, in-laid scrim, any combination thereof, and the like. Additionally, such fabrics may include fibers other than the inventive polypropylene fibers, including, without limitation, natural fibers, such as cotton, wool, abaca, hemp, ramie, and the like; synthetic fibers, such as polyesters, polyamides, polyaramids, other polyolefins (including non-low-shrink polypropylene), polylactic acids, and the like; inorganic fibers such as glass, boron-containing fibers, and the like; and any blends thereof.

Of particular interest as end-uses for such inventive tape fibers are primary carpet backings and thus carpets comprising such backing components. These are described in greater detail below. Furthermore, woven fabrics comprising such fibers are highly desirable as well for such areas as geotextiles, supersacks, and the like, basically any end-use requiring strong fibers at low cost.

BRIEF DESCRIPTION OF THE DRAWING

The accompanying drawings, which are incorporated in and constitute a part of this specification, illustrate a potentially preferred embodiment of producing the inventive low-shrink polypropylene fibers and together with the description serve to explain the principles of the invention wherein:

FIG. 1 is a schematic of the potentially preferred method of producing low-shrink polypropylene tape fibers.

FIG. 2 is a side view of a preferred carpet article comprising the inventive fibers within a backing.

DETAILED DESCRIPTION OF THE DRAWING AND OF THE PREFERRED EMBODIMENT

FIG. 1 depicts the non-limiting preferred procedure followed in producing the inventive low-shrink polypropylene tape fibers. The entire fiber production assembly 10 comprises a mixing manifold 11 for the incorporation of molten polymer and additives (such as the aforementioned nucleator compound) which then move into an extruder 12. The extruded polymer is then passed through a metering pump 14 to a die assembly 16, whereupon the film 17 is produced. The film 17 then immediately moves to a quenching bath 18 comprising a liquid, such as water, and the like, set at a temperature from 5 to 95° C. (here, preferably, about room temperature). The drawing speed of the film at this point is dictated by draw rolls and tensionsing rolls 20, 22, 24, 26, 28 set at a speed of about 100 feet/minute, preferably, although the speed could be anywhere from about 20 feet/minute to about 200 feet/minute, as long as the initial drawing speed is at most about $\frac{1}{5}^{th}$ that of the heat-draw speed later in the procedure. The quenched film 19 should not exhibit any appreciable crystal orientation of the polymer therein for further processing. Sanding rolls 30, 31, 32, 33, 34, 35, may be optionally utilized for delustering of the film, if desired. The quenched film 19 then moves into a cutting area 36 with a plurality of fixed knives 38 spaced at any distance apart desired. Preferably, such knives 38 are spaced a distance determined by the equation of the square root of the draw speed multiplied by the final width of the target fibers (thus, with a draw ratio of 5:1 and a final width of about 3 mm, the blade gap measurements should be about 6.7 mm). Upon slitting the quenched film 19 into fibers 40, such fibers are moved uniformly through a series of nip and tensioning rolls 42, 43, 44, 45 prior to being drawn into a high temperature oven 46 set at a temperature level of between about 280 and 350° F., in this instance about 310° F., at a rate as noted above, at least 5 times that of the initial drawing speed. Such an increased drawing speed is effectuated by a series of heated drawing rolls 48, 50 (at temperatures of about 360–450° F. each) over which the now crystal-oriented fibers 54 are passed. A last tensioning roll 52 leads to a spool (not illustrated) for winding of the finished tape fibers 54.

Turning to FIG. 2, then, an inventive carpet article 110 is shown comprising a pile layer 112 comprising tufted fibers 114 tufted through a primary backing layer or tufting substrate comprising the inventive fibers 113 (which could be woven, knit, or non-woven in structure and comprise, as additional fibers, any type of natural fibers, such as cotton, and the like, or synthetic fibers, such as polyamide, and the like; preferably, it is a woven substrate comprising polyamide fibers), and embedded within one or more adhesive layers 115, to which is attached a stabilizing layer 116 (such as a glass mat), and a foam or cushion layer 118 (which may be a fabric, such as a felt, or resin, such as polyvinyl chloride other like compound; preferably, it is polyurethane foam). The stabilizing layer 116 is adhered to both the pile layer 112 and a cushion layer 118 to form the desired carpet article 110. The inventive primary backing layer 113, comprising such low-shrink polypropylene tape fibers, thus accords the desired low-shrink characteristics to the entire carpet article 110 itself. Of course, alternative configurations and arrangements of backing layers (such as an increase or decrease in the number required) as well as types of fibers (such as berber, short pile, and the like) within the pile layer may be employed, as well as myriad other variations common within the carpet art and industry. See, for example, U.S. Pat. Nos. 6,203,881 or 6,468,623, as examples of such carpet products.

Inventive Fiber and Yarn Production

The following non-limiting examples are indicative of the preferred embodiment of this invention:

EXAMPLE 1

The carpet backing slit film fibers were made on the standard production equipment as described above at a production rate of 500 ft/min as follows: A 3.5–3.8 melt flow homopolymer polypropylene resin (P4G32-050, from Huntsman) was blended with an additive concentrate consisting of 4 MFI homopolypropylene resin and a nucleator in amounts as listed below in TABLE 1. The blending ratio was changed to adjust the final additive level, as shown in the table below. This mixture, consisting of PP resin and the additive, was extruded with a single screw extruder through a film dye approximately 72 inches wide. The PP flow was adjusted to give a final tape thickness of approximately 0.0025 inches. The molten film was quenched in room temperature (about 25° C.) water, then transferred by rollers to a battery of knives, which cut it into parallel strips. At additive levels above approximately 100 ppm concentration of 4-methyl-DBS (aka, p-methyl-DBS) the film appeared clear. The film, having been slit into strips, was conveyed across three large rolls into an oven approximately 14 ft long (set at a temperature given below) where it was heated and drawn to the draw ratio given below. After leaving the oven, the film strips passed over three rolls, the first two heated by hot oil to a temperatures of 342° F. (172–3° C.) with the last roll being unheated. The first of these three rolls has a linear velocity somewhat greater than 500 ft/min, with the difference expressed as the relax percentage, where the relax percentage is the percentage of 500 ft/min that the first roll was running faster than the third, which was running at 500 ft/min. These film strips were then traversed to winders where they were individually wound. These final film strips are thus referred to as the polypropylene tape fibers.

Several tape fibers were made in this manner, adjusting the concentrated additive-PP mixture level to adjust the final additive level. These tape fibers were tested for tensile properties using an MTS Sintech 10/G instrument. An FTS-1000 Force Shrinkage Tester from Lawson-Hemphill was used to test high temperature shrinkage. The heater temperature was set to 127° C., which gives the same shrinkage measurements as a 5 minute hot air shrinkage at 150° C. in a convection oven. All of the shrinkage results are reported in the table below for different nucleator compound levels in different fibers. Creep was measured by fixing one end of a tape fiber near the top of a convection oven while suspending a 225 g weight at the other end of the fiber with the oven temperature at 50° C. A ten inch length was marked before hanging the weight in the oven, and the length of this originally-ten-inch piece was measured after hanging in the oven at 50° C. for 15 hours. The creep is reported as a percentage. The results for each example below are actually the average for four separate trials at the same additive level for each different nucleator.

TABLE 1

Homopolymer (HP) Formulations With Nucleator Additives For Yarn Samples

| Yarn Formulation # | Nucleator (ppm) |
|---|---|
| 1 | MDBS (2250) |
| 2 | MDBS (3000) |
| 3 | DMDBS (2250) |
| 4 | MDBS (2250) + Pigment (1000) |
| 5 | HPN-68 (2250) |

A control formulation was utilized as well without any nucleator present. These formulations were then compounded and formed into yarns through the drawing and heat-discussed setting procedures discussed above. The oven temperatures, draw ratios, and relax ratios for each different set of samples yarns were as follows in TABLE 2:

TABLE 2

Manufacturing And Processing Conditions For Sample Yarns

| Yarn Sample | Yarn Formulation | Oven Temp. (° F.) (° C.) | Draw Ratio | Relax Ratio |
|---|---|---|---|---|
| A | 1 | 275 (135) | 6.8 | 16 |
| B | 1 | 275 (135) | 6.8 | 10 |
| C | 1 | 275 (135) | 6.2 | 16 |
| D | 1 | 275 (135) | 6.2 | 10 |
| E | 1 | 300 (149) | 6.2 | 10 |
| F | 1 | 300 (149) | 6.2 | 16 |
| G | 1 | 300 (149) | 6.8 | 10 |
| H | 1 | 300 (149) | 6.8 | 16 |
| I | 1 | 315 (157) | 6.2 | 16 |
| J | 1 | 315 (157) | 6.2 | 10 |
| K | 1 | 315 (157) | 6.8 | 16 |
| L | 1 | 315 (157) | 6.8 | 10 |
| M | 2 | 275 (135) | 6.8 | 16 |
| N | 2 | 275 (135) | 6.8 | 10 |
| O | 2 | 275 (135) | 6.2 | 16 |
| P | 2 | 275 (135) | 6.2 | 10 |
| Q | 3 | 275 (135) | 6.2 | 10 |
| R | 3 | 275 (135) | 6.2 | 16 |
| S | 3 | 275 (135) | 6.8 | 10 |
| T | 3 | 275 (135) | 6.8 | 16 |
| U | 4 | 300 (149) | 6.2 | 16 |
| V | 4 | 300 (149) | 6.2 | 10 |
| W | 4 | 300 (149) | 6.8 | 16 |
| X | 4 | 300 (149) | 6.8 | 10 |
| Y | 5 | 300 (149) | 6.2 | 16 |
| Z | 5 | 300 (149) | 6.2 | 10 |
| AA | 5 | 300 (149) | 6.8 | 16 |
| BB | 5 | 300 (149) | 6.8 | 10 |
| (Comparatives) | | | | |
| CC | unnucleated | 300 (149) | 6.2 | 10 |
| DD | " | 300 (149) | 6.2 | 16 |
| EE | " | 300 (149) | 6.8 | 10 |
| FF | " | 300 (149) | 6.8 | 16 |
| GG | " | 275 (135) | 6.2 | 16 |
| HH | " | 275 (135) | 6.2 | 10 |
| II | " | 275 (135) | 6.8 | 16 |
| JJ | " | 275 (135) | 6.8 | 10 |

Such yarns were then measured for a variety of different physical characteristics, including denier, peak load, elongation at peak load, fiber tenacity, 1% secant modulus, 3% secant modulus, 5% secant modulus, and, lastly 150° C. hot air shrinkage. The results are tabulated for each yarn sample below (with each measurement actually the mean result for four different yarns produced in the same manner as in the tables above):

TABLE 3

Inventive Tape Fiber Yarn Measurements

| Yarn # | Denier | Peak Load (gf) | % Elongation at Peak Load | Fiber Ten. (gf/denier) | Secant Modulus 1% | Secant Modulus 3% | Secant Modulus 5% | Shrinkage at 150° C. |
|---|---|---|---|---|---|---|---|---|
| A | 1102 | 3998 | 17.42 | 3.63 | 47.05 | 31.98 | 28.58 | 3.67 |
| B | 1108 | 4395 | 17.15 | 3.97 | 46.98 | 33.59 | 30.83 | 4.42 |
| C | 1105 | 3982 | 23.81 | 3.60 | 44.89 | 28.14 | 24.48 | 3.26 |
| D | 1104 | 4395 | 21.76 | 3.99 | 45.48 | 30.92 | 27.52 | 3.26 |
| E | 1102 | 3919 | 17.30 | 3.56 | 46.21 | 30.90 | 27.62 | 2.93 |
| F | 1110 | 4033 | 24.20 | 3.64 | 41.57 | 26.85 | 23.86 | 2.10 |
| G | 1104 | 4228 | 15.40 | 3.82 | 45.39 | 33.36 | 31.42 | 3.32 |
| H | 1100 | 4145 | 17.62 | 3.77 | 41.04 | 29.81 | 27.70 | 3.00 |
| I | 1125 | 4311 | 22.23 | 3.85 | 41.70 | 28.45 | 25.54 | 2.29 |
| J | 1127 | 4721 | 20.98 | 4.19 | 40.78 | 29.97 | 27.90 | 2.89 |
| K | 1126 | 4200 | 16.02 | 3.77 | 44.51 | 32.33 | 30.45 | 2.75 |

TABLE 3-continued

Inventive Tape Fiber Yarn Measurements

| Yarn # | Denier | Peak Load (gf) | % Elongation at Peak Load | Fiber Ten. (gf/denier) | Secant Modulus 1% | 3% | 5% | Shrinkage at 150° C. |
|---|---|---|---|---|---|---|---|---|
| L | 1129 | 4081 | 12.88 | 3.62 | 40.96 | 34.09 | 33.07 | 3.17 |
| M | 1305 | 3955 | 15.96 | 3.03 | 37.92 | 26.86 | 24.63 | 2.24 |
| N | 1233 | 3747 | 12.92 | 3.07 | 45.19 | 33.78 | 30.58 | 2.86 |
| O | 1224 | 3729 | 21.05 | 3.05 | 38.27 | 26.32 | 23.42 | 1.58 |
| P | 1201 | 3661 | 15.70 | 3.26 | 48.63 | 34.20 | 29.76 | 2.35 |
| Q | 1128 | 4073 | 18.60 | 3.62 | 47.79 | 33.02 | 28.98 | 2.59 |
| R | 1210 | 3901 | 20.85 | 3.24 | 43.26 | 29.04 | 24.92 | 2.19 |
| S | 1215 | 4095 | 14.47 | 3.36 | 41.87 | 31.59 | 29.13 | 3.19 |
| T | 1215 | 4041 | 19.56 | 3.33 | 40.24 | 28.46 | 25.20 | 3.08 |
| U | 1223 | 3605 | 20.45 | 2.97 | 37.18 | 24.61 | 21.44 | 1.81 |
| V | 1228 | 3844 | 18.67 | 3.15 | 37.84 | 27.28 | 24.39 | 1.92 |
| W | 1220 | 4073 | 17.08 | 3.32 | 39.90 | 30.07 | 27.52 | 2.21 |
| X | 1220 | 3896 | 14.68 | 3.20 | 41.12 | 31.72 | 28.76 | 2.70 |
| Y | 1195 | 4676 | 28.55 | 3.95 | 35.91 | 24.28 | 21.51 | 3.01 |
| Z | 1204 | 3980 | — | 3.31 | 36.50 | 26.45 | 23.86 | 3.83 |
| AA | 1197 | 4307 | 19.15 | 3.57 | 33.64 | 26.91 | 24.94 | 4.09 |
| BB | 1204 | 4452 | 18.08 | 3.74 | 36.81 | 28.90 | 27.52 | 4.70 |
| (Comparatives) | | | | | | | | |
| CC | 1215 | 4649 | 18.63 | 3.83 | 43.00 | 30.28 | 26.87 | 7.71 |
| DD | 1216 | 4819 | 23.53 | 3.97 | 39.22 | 26.83 | 23.73 | 6.41 |
| EE | 1132 | 4414 | 14.15 | 3.91 | 49.16 | 34.94 | 32.29 | 11.21 |
| FF | 1198 | 4349 | 17.04 | 3.61 | 42.62 | 30.49 | 27.37 | 9.31 |
| GG | 1196 | 4536 | 22.21 | 3.80 | 42.42 | 27.47 | 23.87 | 6.73 |
| HH | 1201 | 4307 | 19.90 | 3.60 | 40.17 | 25.90 | 22.96 | 7.98 |
| II | 1200 | 4547 | 17.93 | 3.76 | 45.14 | 30.05 | 26.77 | 9.70 |
| JJ | 1269 | 4593 | 15.78 | 3.65 | 47.13 | 31.71 | 28.58 | 11.05 |

Thus, the inventive fibers provided excellent low shrinkage rates and very good physical characteristics as well, particularly as compared to unnucleated yarns.

X-ray Scattering Analysis

The long period spacing of several of the above yarns was tested by small angle x-ray scattering (SAXS). The small angle x-ray scattering data was collected on a Bruker AXS (Madison, Wis.) Hi-Star multi-wire detector placed at a distance of 105 cm from the sample in an Anton-Paar vacuum chamber where the chamber was evacuated to a pressure of not more than 100 mTorr. X-rays ($\lambda$=1.54178 Å) were generated with a MacScience rotating anode (40 kV, 40 mA) and focused through three pinholes to a size of 0.2 mm. The entire system (generator, detector, beampath, sample holder, and software) is commercially available as a single unit from Bruker AXS. The detector was calibrated per manufacturer recommendation using a sample of silver behenate.

A typical data collection was conducted as follows. To prepare the sample, the yarn was wrapped around a 3 mm brass tube with a 2 mm hole drilled in it, and then the tube was placed in an Anton-Paar vacuum sample chamber on the x-ray equipment such that the yarn was exposed to the x-ray beam through the hole. The path length of the x-ray beam through the sample was between 2–3 mm. The sample chamber and beam path was evacuated to less than 100 mTorr and the sample was exposed to the X-ray beam for one hour. Two-dimensional data frames were collected by the detector and unwarped automatically by the system software. The data were smoothed within the system software using a 2-pixel convolution prior to integration. To obtain the intensity scattering data [I(q)] as a function of scattering angle [2θ] the data were integrated over $\lambda$ with the manufacturer's software set to give a 2θ range of 0.2°–2.5° in increments of 0.01° using the method of bin summation.

The data was collected upon exposure to such high temperatures for one-half hour, and subtracting the baseline obtained by taking similar data with no tape fiber sample in place. The long period measurements were taken and are tabulated below in nanometers.

TABLE 4

Long Period SAXS Data for Inventive Tape Fibers

| Sample | Long Period |
|---|---|
| A | 26.25 |
| B | 25.30 |
| C | 26.90 |
| D | 23.25 |
| E | 27.55 |
| F | 25.55 |
| G | 24.95 |
| H | 25.35 |
| I | 27.30 |
| J | 26.50 |
| K | 25.55 |
| L | 25.00 |
| M | 26.25 |
| N | 26.65 |
| O | 26.30 |
| P | 27.35 |
| Q | 29.70 |
| R | 30.40 |
| S | 25.00 |
| T | 25.85 |
| U | 25.75 |
| V | 26.75 |
| W | 25.10 |
| X | 24.90 |
| Y | 25.15 |
| Z | 25.50 |
| AA | 25.35 |
| BB | 24.40 |

Yarns of the tape fibers above were then woven into a primary carpet backing component for carpet tiles. Such tape fibers were made with knives set to cut the tape to different widths, such that yarns of both approximately 100 and 600 denier measurements were made. The 600 denier yarns were warped at 24 yarns/inch and a full width of about 168 inches. These warped yarns were then woven with the wider, 1100 denier yarns on a rapier loom at approximately 12 picks per inch to provide a backing substrate. Upon attachment of such a backing (18 inches wide) to a tufted substrate (also 18 inches wide), followed by printing with liquid colorants and dyes of the surface opposite the backing itself, the resultant composite was then exposed to drying temperatures (about 130° C.). The complete composite subsequently exhibited no appreciable modification of the dimensions thereof. A comparative polypropylene tape fiber-containing primary backing exhibited a shrinkage rate of about 4–5%, thereby reducing the dimensions of the comparative tufted substrate/primary backing composite by a similar amount. Thus, it is apparent that the inventive tape fibers are substantial improvements over the typical, traditional, state of the art polypropylene tape fibers utilized today.

There are, of course, many alternative embodiments and modifications of the present invention which are intended to be included within the spirit and scope of the following claims.

What is claimed is:

1. A polypropylene tape fiber, wherein said fiber comprises between about 2000 ppm and about 5000 ppm of a nucleator compound and wherein said fiber exhibits a 150 degree C shrinkage of less than about 4% wherein said fiber exhibits a 3% secant modulus of greater than about 24 g/den.

2. The polypropylene fiber of claim 1 wherein said nucleator compound is selected from the group consisting of p-MDBS, 3,4-DMDBS, 2,4,5-TMDBS, DBS, sodium phosphate salts, lithium phosphate salts, sodium 2,2'-methylene-bis-(4,6-di-tert-butylphenyl)phosphate, disodium [2.2.1]heptane bicyclodicarboxylate, and any mixtures thereof.

3. The polypropylene fiber of claim 2 wherein said nucleating agent is p-MDBS.

4. The polypropylene tape fiber of claim 2 wherein said nucleator compound comprises 3,4-DMDBS.

5. The polypropylene tape fiber of claim 2 wherein said nucleator compound comprises 2,4,5-TMDBS.

6. The polypropylene tape fiber of claim 2 wherein said nucleator compound comprises DBS.

7. The polypropylene tape fiber of claim 1 wherein said nucleator compound comprises sodium benzoate.

8. The polypropylene tape fiber of claim 2 wherein said nucleator compound comprises at least one sodium phosphate salt.

9. The polypropylene tape fiber of claim 2 wherein said nucleator compound comprises at least one lithium phosphate salt.

10. The polypropylene tape fiber of claim 2 wherein said nucleator compound comprises sodium 2,2'-methylene-bis-(4,6-di-tert-butylphenyl)phosphate.

11. The polypropylene tape fiber of claim 2 wherein said nucleator compound comprises disodium [2.2.1]heptane bicyclodicarboxylate.

12. The polypropylene tape fiber of claim 2 wherein said nucleator compound is a blend of one or more of those provided in the group of claim 2.

13. A polypropylene tape fiber, wherein said fiber comprises between about 2000 ppm and about 5000 ppm of a nucleator compound, said fiber exhibiting a tenacity of greater than about 2.5 gmf/den and a 3% secant modulus of greater than about 24 g/den.

14. The polypropylene fiber of claim 13 wherein said nucleator compound is selected from the group consisting of p-MDBS, 3,4-DMDBS, 2,4,5-TMDBS, DBS, sodium phosohate salts, lithium phosohate salts, sodium 2,2'-methylene-bis-(4,6-di-tert-butylphenyl)phosohate, disodiuin [2.2.1]heptane bicyclodicarboxylate, and any mixtures thereof.

15. The polypropylene fiber of claim 14 wherein said nucleating agent is p-MDBS.

16. The polypropylene tape fiber of claim 14 wherein said nucleator compound comprises 3,4-DMDBS.

17. The polypropylene tape fiber of claim 14 wherein said nucleator compound comprises 2,4,5-TMDBS.

18. The polypropylene tape fiber of claim 14 wherein said nucleator compound comprises DBS.

19. The polypropylene tape fiber of claim 13 wherein said nucleator compound comprises sodium benzoate.

20. The polypropylene tape fiber of claim 14 wherein said nucleator compound comprises at least one sodium phosphate salt.

21. The polypropylene tape fiber of claim 14 wherein said nucleator compound comprises at least one lithium phosphate salt.

22. The polypropylene tape fiber of claim 14 wherein said nucleator compound comprises sodium 2,2'-methylene-bis-(4,6-di-tert-butylphenyl)phosphate.

23. The polypropylene tape fiber of claim 14 wherein said nucleator compound comprises disodium [2.2.1]heptane bicyclodicarboxylate.

* * * * *